(12) United States Patent
Yanai

(10) Patent No.: US 11,881,933 B2
(45) Date of Patent: Jan. 23, 2024

(54) ENHANCED ROBUST INPUT PROTOCOL FOR SECURE MULTI-PARTY COMPUTATION (MPC) VIA HIERARCHICAL PSEUDORANDOM SECRET SHARING

(71) Applicant: VMware LLC, Palo Alto, CA (US)

(72) Inventor: Avishay Yanai, Herzliya (IL)

(73) Assignee: VMware LLC, Palo Alto, CA (US)

( * ) Notice: Subject to any disclaimer, the term of this patent is extended or adjusted under 35 U.S.C. 154(b) by 176 days.

(21) Appl. No.: 17/505,948

(22) Filed: Oct. 20, 2021

(65) Prior Publication Data

US 2023/0120202 A1    Apr. 20, 2023

(51) Int. Cl.
*H04L 9/08* (2006.01)
*H04L 9/30* (2006.01)

(52) U.S. Cl.
CPC ............ *H04L 9/085* (2013.01); *H04L 9/0825* (2013.01); *H04L 9/0869* (2013.01); *H04L 9/3006* (2013.01)

(58) Field of Classification Search
None
See application file for complete search history.

(56) References Cited

U.S. PATENT DOCUMENTS

| | | | | |
|---|---|---|---|---|
| 2022/0069980 | A1* | 3/2022 | Ohara | G06F 7/556 |
| 2022/0141000 | A1* | 5/2022 | Tsuchida | H04L 9/0869 |
| | | | | 380/28 |
| 2022/0417003 | A1* | 12/2022 | Giacomelli | H04L 9/085 |
| 2023/0186293 | A1* | 6/2023 | Dolev | H04L 9/0869 |
| | | | | 705/75 |

OTHER PUBLICATIONS

Ittai Abraham et al., "Blinder-Scalable, Robust Anonymous Committed Broadcast". In: Proceedings of the 2020 ACM SIGSAC Conference on Computer and Communications Security. 2020, pp. 1233-1252.
Ronald Cramer et al., "Share conversion, pseudorandom secret-sharing and applications to secure computation". In: Theory of Cryptography Conference. Springer. 2005, pp. 342-362.
Adi Shamir.,"How to share a secret". In: Communications of the ACM 22.11 (1979), pp. 612-613.

* cited by examiner

*Primary Examiner* — Bassam A Noaman
(74) *Attorney, Agent, or Firm* — Quarles & Brady LLP

(57) ABSTRACT

An enhanced robust input protocol for secure multi-party computation (MPC) via pseudorandom secret sharing is provided. With this enhanced protocol, the servers that participate in MPC can generate and send a single random sharing [R] to a client with k inputs (rather than a separate random sharing per input), and the client can derive k pseudorandom sharings from [R] without any further server interactions.

21 Claims, 3 Drawing Sheets

ENHANCED ROBUST INPUT PROTOCOL FOR SECURE MULTI-PARTY COMPUTATION (MPC) VIA HIERARCHICAL PSEUDORANDOM SECRET SHARING

BACKGROUND

Unless otherwise indicated, the subject matter described in this section is not prior art to the claims of the present application and is not admitted as being prior art by inclusion in this section.

Secure multi-party computation (MPC) is a cryptographic technique that enables two or more parties to jointly compute a function over a set of inputs while keeping those inputs secret/private. For example, consider a scenario in which three parties $P_1$, $P_2$, and $P_3$ hold private inputs a, b, and c respectively and would like to obtain the sum a+b+c. MPC provides protocols that allow parties $P_1$, $P_2$, and $P_3$ to achieve this without revealing anything else regarding a, b, and c to each other.

A common approach for designing an MPC protocol involves having each party distribute cryptographic shares of its input to the other parties using a secret sharing scheme such as Shamir's secret sharing. The set of all shares of a secret s is called a sharing of s and is denoted as [s]. Through the use of secret sharing, each party can receive partial information regarding the other parties' inputs, which is sufficient for the parties to carry out the MPC computation but insufficient (at least in isolation) for the parties to learn the inputs themselves. In an MPC protocol executed by n parties, the sharing of an input X via a secret sharing scheme with threshold t is secure in the sense that up to t of the n parties may be corrupted (i.e., controlled by a malicious adversary) and disclose their shares to each other without learning anything regarding X.

In some cases, the parties that execute an MPC protocol (referred to herein as "servers") do not process their own inputs; instead, they process inputs that are submitted by and private to other entities (referred to herein as "clients"). Accordingly, in these cases an input mechanism is needed that enables the clients to submit their inputs to the servers in a confidential manner. One approach is for each client to distribute a sharing of its input to the servers using a secret sharing scheme as noted above. However, this approach makes it difficult to distinguish between corrupted clients and corrupted servers, which can lead to undesirable outcomes.

For example, assume a corrupted client $C_{corrupt}$ provides an honest server S honest with a share that is invalid under the rules of the secret sharing scheme, with the goal of framing $S_{honest}$. In this scenario, if $S_{honest}$ (rather than $C_{corrupt}$) is determined to be corrupted, $S_{honest}$ will be wrongly excluded from participating in the MPC computation. Conversely, assume a corrupted server $S_{corrupt}$ receives a correct share from an honest client $C_{honest}$ but uses a different, invalid share in later processes or claims that $C_{honest}$ never sent a share, with the goal of framing $C_{honest}$. In this scenario, if $C_{honest}$ (rather than $S_{corrupt}$) is determined to be corrupted, $C_{honest}$ will be wrongly censored (i.e., its input will be dropped from the MPC computation).

To address the foregoing, an input mechanism known as robust input protocol (RIP) has been proposed that eliminates the ambiguity of client or server corruption. With RIP, the servers transmit a sharing of a random secret R to each client and the client transmits a single public value back to the servers via a secure broadcast channel. The servers then use the single public value, along with their shares of [R], to construct their respective shares of the client's input. This means that a corrupted client cannot frame an honest server by sending an invalid share to that server because the same public value is broadcast to all servers. Further, a corrupted server cannot frame an honest client by erroneously claiming that it did receive anything from that client because the properties of the secure broadcast channel ensure that every message received by one server is also received by all other servers.

One drawback with current RIP implementations is that the servers must generate and provide to each client a separate random sharing for every input to be submitted by that client. Stated another way, if there are m clients and k inputs per client, the servers must generate and provide a total of m·k random sharings to the clients. In many MPC applications m and/or k can be very large (e.g., on the order of thousands or millions), which makes this process prohibitively time-consuming and resource intensive.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to an enhanced robust input protocol for MPC, referred to herein as "eRIP," that leverages pseudorandom secret sharing to reduce the overhead of generating and providing random sharings from servers to clients. Pseudorandom secret sharing is a feature of a secret sharing scheme known as replicated secret sharing and allows for an infinite number of pseudorandom sharings to be derived from one random sharing.

With eRIP, there is no need for the servers to generate and send k separate random sharings to a client that has k inputs; rather, the servers can generate and send a single random sharing [R] and the client can derive k pseudorandom sharings from [R] without any further server interactions. Accordingly, this protocol is significantly more efficient and performant than conventional RIP for large values of k. Further, eRIP can be extended in a hierarchical manner (i.e., via multiple layers of pseudorandom sharings derived from original random sharing [R]) to support multiple clients and multiple protocol epochs per client. These and other aspects are described in further detail below.

2. Example Environment and High-Level Protocol Design

Figure 1:
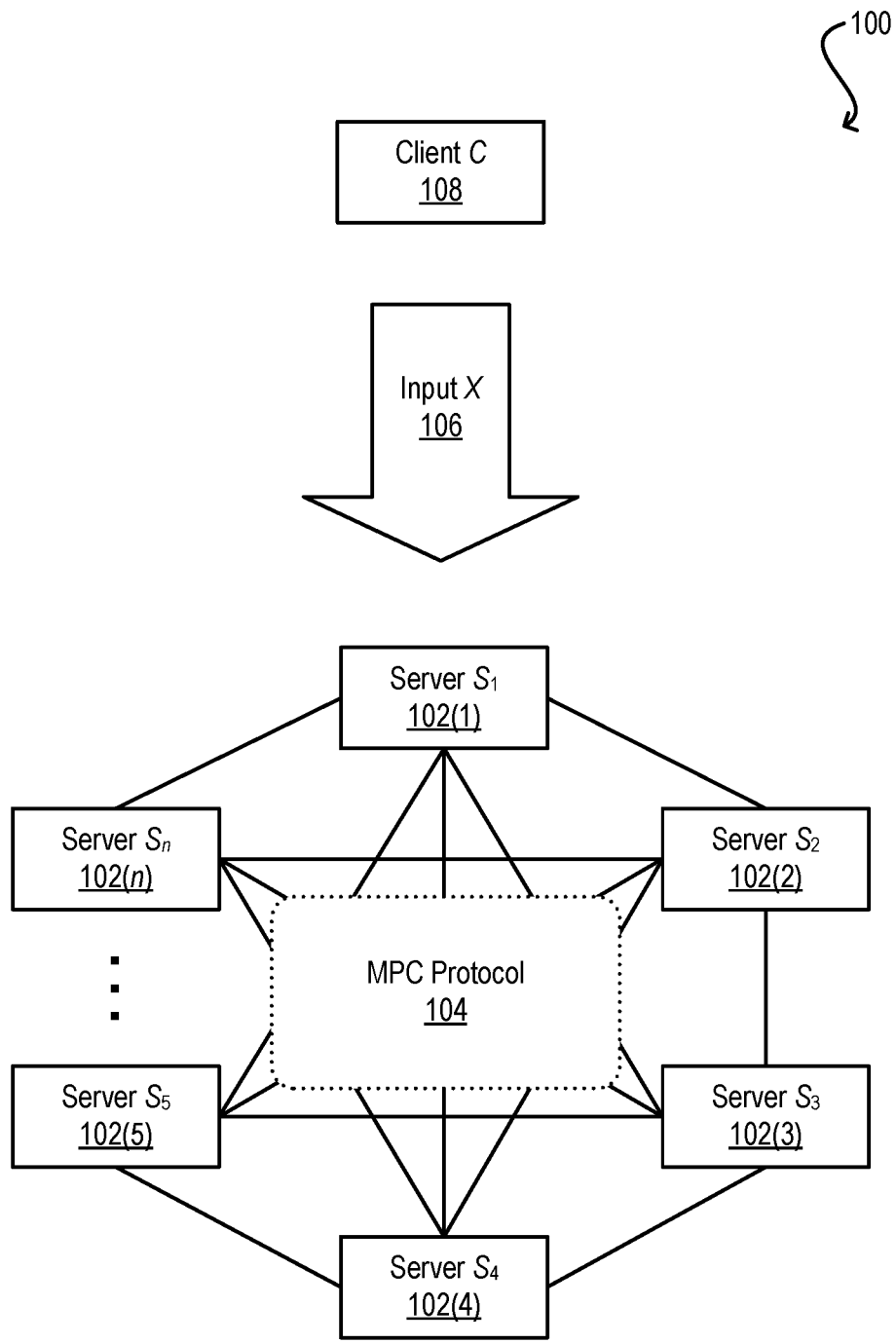
FIG. 1 depicts an example environment according to certain embodiments.

FIG. 1 depicts an example environment 100 in which embodiments of the present disclosure may be implemented. As shown, environment 100 includes n servers $S_1, \ldots, S_n$ (reference numerals 102(1)-(n)) that are configured to execute an MPC protocol 104 on an input X (reference numeral 106) submitted by a client C (reference numeral 108). For example, MPC protocol 104 may involve computing a function F over input X, either alone or in combination with other inputs provided by other clients. Input X—which may be any type of data instance or set of data instances—is private to client C and thus it is important that X is submitted to servers $S_1, \ldots, S_n$ in a confidential manner, such that the servers are able to perform the protocol computation but unable learning anything regarding X itself.

According to one approach, referred to herein as "client sharing," client C can create a sharing of input X (i.e., [X]) using a threshold secret sharing scheme such as Shamir's secret sharing and can provide each server $S_i$ a share $X_1$ of [X]. The servers can then operate on their respective shares to carry out the protocol computation. In the case of Shamir's secret sharing, each share $X_i$=p(i) where p is t-degree polynomial with p(0)=X and where t is the maximum possible number of corrupted servers. It is well known that such a t-degree polynomial theoretically hides the secret encoded at p(0) from any subset of at most t shareholders. Thus, with client sharing, client C can ensure that a coalition of up to t corrupted servers cannot learn input X by colluding and disclosing their shares to each other. Unfortunately, as noted in the Background section, this approach makes it difficult to distinguish between corrupted clients and corrupted servers in certain scenarios, which can enable a corrupted client to exclude an honest server from protocol participation and can enable a corrupted server to censor an honest client.

According to another approach, known as robust input protocol or RIP, servers $S_1, \ldots, S_n$ can establish a sharing of a random value R (i.e., [R]) where R is hidden from the servers. In particular, each server $S_i$ can obtain a share $R_i$ of [R]. The servers can then transmit their respective shares of [R] to client C. In response, client C can reconstruct R from the received shares, subtract R from its input X to generate a singular delta value Δ, and publicly broadcast Δ to servers $S_1, \ldots, S_n$ via a secure broadcast channel. Each server $S_i$ can subsequently receive delta value Δ, compute its share $X_i$ of input X as Δ+$R_i$, and use $X_i$ for the protocol computation.

With RIP, it is not possible for a corrupted server to cheat by wrongly claiming that it did not receiving anything from client C because the honest servers will know that such a claim is false per the properties of the secure broadcast channel. Further, it is not possible for client C to cheat by sending different values to different servers because C must broadcast the same value to all servers. Accordingly, RIP largely fixes the deficiencies of the client sharing approach.

However, a problem with current RIP implementations is that servers $S_1, \ldots, S_i$, must generate and provide a separate random sharing to client C for every input to be submitted by C. For example, assume client C has k inputs $X^{(1)}, \ldots, X^{(k)}$. In this scenario, servers $S_1, \ldots, S_n$ must generate and provide k random sharings $[R^{(1)}], \ldots, [R^{(k)}]$ to C so that C can determine appropriate delta values $\Delta^{(1)}, \ldots, \Delta^{(k)}$ corresponding to inputs $X^{(1)}, \ldots, X^{(k)}$. If k is very large (which is common in many real-world MPC applications), the process of generating and providing these random sharings will significantly increase the resource overhead and time needed to complete execution of MPC protocol 104. In addition, this problem will be further exacerbated if there are multiple clients (each with k inputs) and/or each client is configured to submit k inputs over multiple protocol rounds (i.e., epochs), as the number of required random sharings will be multiplied by the number of clients and epochs.

To address the foregoing and other similar issues, embodiments of the present disclosure provide an enhanced robust input protocol (eRIP) that removes the need for servers to generate and provide separate random sharings for the inputs of a client. This protocol leverages replicated secret sharing (RSS) and in particular a feature of RSS known as pseudorandom secret sharing (PRSS). RSS is a threshold secret sharing scheme that is similar in general functionality to Shamir's secret sharing, but rather than encoding shares of a secret s as points along a t-degree polynomial p where s=p(0), RSS encodes the shares as terms of a summation equation that equals s. These shares, which are referred to herein as "replicated shares" and collectively form a "replicated sharing" of s (i.e., [s]), are then distributed across n receivers in a manner that ensures a coalition of at least t+1 receivers is needed to reconstruct s using their respective replicated shares.

For example, assume n=3 (i.e., there are three receivers $r_1$, $r_2$, and $r_3$) and t=1. In this case, the secret holder (also known as dealer) can randomly select three replicated shares $s_1$, $s_2$, and $s_3$ such that $s=s_1+s_2+s_3$ and can provide receiver $r_1$ with $s_2$ and $s_3$, receiver $r_2$ with $s_1$ and $s_3$, and receiver $r_3$ with $s_1$ and $s_2$. This guarantees that no single receiver can reconstruct secret s because $r_1$, $r_2$, and $r_3$ are missing $s_1$, $s_2$, and $s_3$ respectively; only a subset of two or more receivers can perform this reconstruction by combining their replicated shares, which is consistent with threshold t=1. The set of replicated shares of secret s held by each receiver $r_i$ is denoted herein as $s_{A(j)}$.

PRSS builds upon RSS and allows an infinite number of pseudorandom replicated sharings to be created/derived from a single random replicated sharing. For instance, returning to the example above where replicated sharing [s] is distributed among receivers $r_1$, $r_2$, and $r_3$, assume s is a random key and $r_1$, $r_2$, and $r_3$ have access to a pseudorandom function (PRF) $f$ (g, i) that takes as input a PRF key g and an input value i and outputs a pseudorandom value that is indistinguishable from the output of a truly random function. In this case, each receiver $r_j$ can use PRSS to obtain a respective set of replicated shares $s_{A(j)}^{(i)}$ of a new pseudorandom key $s^{(i)}$ from its existing set of replicated shares $s_{A(j)}$ of s by computing $f(s_{A(j)}, i)$ on every share in $s_{A(j)}$. This effectively allows receivers $r_1$, $r_2$, and $r_3$ to obtain a new pseudorandom replicated sharing, without any additional communication with the dealer or with each other. Further, each receiver $r_1$ can repeat this process for different values of i in order to obtain sets of replicated shares of infinitely many pseudorandom keys $s^{(1)}$, $s^{(2)}$, $s^{(3)}$, etc., all derived from its set of replicated shares of original random key s.

With the foregoing explanations of RSS and PRSS in mind, eRIP can generally operate as follows:
1. The servers generate/establish a replicated sharing of a random secret key R using RSS and send their respective set of replicated shares of R to a client
2. The client derives k pseudorandom replicated sharings $[R^{(1)}], \ldots, [R^{(k)}]$ from the replicated sharing of R using PRSS (where k corresponds to the number of inputs to be submitted by the client), reconstructs $R^{(1)}, \ldots, R^{(k)}$ from the derived sharings, determines delta values $\Delta^{(1)}, \ldots, \Delta^{(k)}$ based on $R^{(1)}, \ldots, R^{(k)}$ and its inputs, and publicly broadcast $\Delta^{(1)}, \ldots, \Delta^{(k)}$ to the servers via a secure broadcast channel
3. Each server applies PRSS to its set of replicated shares of R in order to obtain k sets of replicated shares corresponding to pseudorandom keys $R^{(1)}, \ldots, R^{(k)}$ and determines k sets of replicated shares corresponding to the client inputs based on $\Delta^{(1)}, \ldots, \Delta^{(k)}$ and the sets of replicated shares of $R^{(1)}, \ldots, R^{(k)}$
4. Each server converts its k sets of replicated shares of the client inputs into k shares that conform to Shamir's secret sharing (i.e., "Shamir shares") and thereafter uses the converted Shamir shares in downstream MPC protocol phases (e.g., protocol computation)

As can be seen from the above, with eRIP the servers only need to provide the client a single random replicated sharing at the start of the protocol; the client and servers can then independently derive k new pseudorandom replicated sharings from that original sharing using PRSS, which in turn allows the client to securely broadcast public delta values for its k inputs to the servers and allows the servers to determine their respective shares of those inputs. Accordingly, eRIP maintains the advantages of RIP (e.g., elimination of client/server corruption ambiguity) while providing significantly improved performance and efficiency as the number of client inputs scales upward.

It should be appreciated that FIG. 1 and the foregoing high-level description of eRIP are illustrative and not intended to limit embodiments of the present disclosure. For example, while FIG. 1 and the foregoing description pertain to a scenario comprising a single client, in various embodiments eRIP can be extended in a hierarchical manner to support multiple clients (and multiple protocol epochs per client). These extensions are discussed in section (4) below.

Further, although step (4) above indicates that each server performs a conversion of its sets of replicated shares of the client inputs into Shamir shares prior to proceeding with later MPC protocol phases, this step is intended to accommodate existing MPC protocols which are largely designed to operate on Shamir shares. To the extent that future MPC protocols are developed or existing MPC protocols are modified to support secret sharing schemes other than Shamir's secret sharing (or support RSS directly), step (4) can be changed to convert the replicated shares into those other secret sharing formats (or can be removed entirely).

3. Protocol Flowchart

Figure 2:
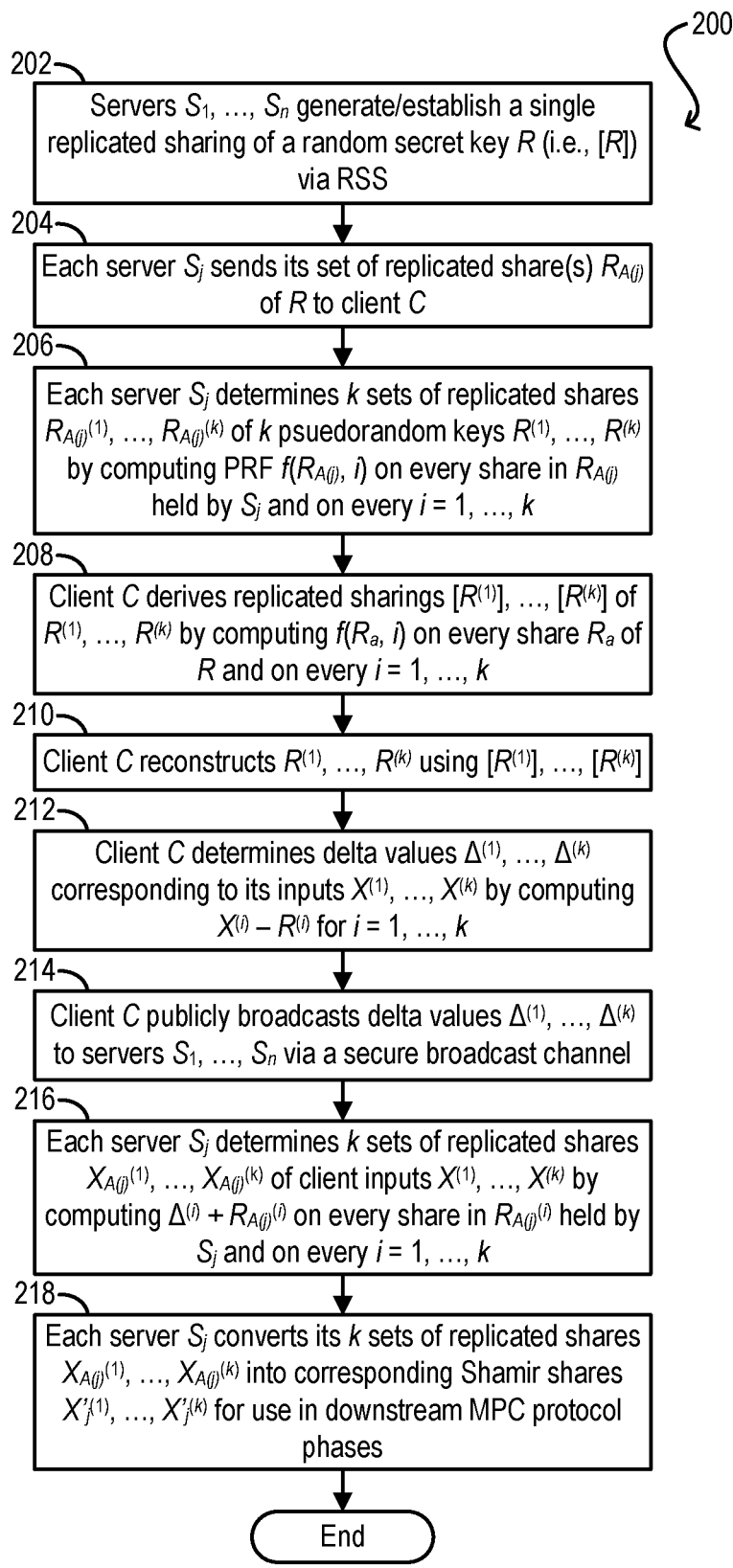
FIG. 2 depicts a protocol flowchart according to certain embodiments.

FIG. 2 depicts a flowchart 200 that details the processing that may be performed by servers $S_1, \ldots, S_n$ and client C of FIG. 1 to carry out eRIP according to certain embodiments. Flowchart 200 assumes that client C has k inputs $X^{(1)}, \ldots, X^{(k)}$ to be submitted to servers $S_1, \ldots, S_n$ for use in MPC protocol 104.

Starting with block 202, servers $S_1, \ldots, S_n$ can generate/establish a single replicated sharing of a random secret key R (i.e., [R]) via RSS, such that (1) each server $S_j$ for $j=1, \ldots, n$ holds a set of one or more replicated shares $R_{A(j)}$ of R and (2) no server knows the value of R. For example, in one set of embodiments servers $S_1, \ldots, S_n$ can receive their respective set of replicated shares $R_{A(j)}$ from a trusted third-party. In another set of embodiments, two servers (e.g., $S_1$ and $S_2$) can create replicated sharings of randomly selected values Y and Z where Y is only known to $S_1$, Z is only known to $S_2$, and random key $R=Y+Z$. Servers $S_1$ and $S_2$ can then distribute the replicated shares of Y and Z to the other servers and each server can compute its set of replicated shares of random key R as the sum of its shares of Y and Z. With this method, no single server will know both Y and Z and thus cannot learn R.

At block 204, each server $S_j$ can send its set of replicated shares $R_{A(j)}$ of random key R to client C. In addition, each server $S_j$ can determine k sets of replicated shares $R_{A(j)}^{(1)}, \ldots, R_{A(j)}^{(k)}$ of k pseudorandom keys $R^{(1)}, \ldots, R^{(k)}$ by computing the PRF $f(R_{A(j)}, i)$ on every replicated share in $R_{A(j)}$ and on every $i=1, \ldots, k$ (block 206).

At block 208, client C can derive replicated sharings $[R^{(1)}], \ldots, [R^{(k)}]$ of the same k pseudorandom keys $R^{(1)}, \ldots, R^{(k)}$ noted above by computing PRF $f(R_a, i)$ on every replicated share $R_a$ in [R] and on every $i=1, \ldots, k$.

Client C can further reconstruct $R^{(1)}, \ldots, R^{(k)}$ using $[R^{(1)}], \ldots, [R^{(k)}]$ (block 210) and determine a set of delta values $\Delta^{(1)}, \ldots, \Delta^{(k)}$ corresponding to its inputs $X^{(1)}, \ldots, X^{(k)}$ by computing $X^{(i)} - R^{(i)}$ for $i=1, \ldots, k$ (block 212). The reconstruction at block 210 can involve summing the individual shares of each pseudorandom sharing. Client C can then publicly broadcast delta values $\Delta^{(1)}, \ldots, \Delta^{(k)}$ to servers $S_1, \ldots, S_n$ via a secure broadcast channel, which guarantees that if one server receives $\Delta^{(1)}, \ldots, \Delta^{(k)}$, all other servers will also receive the exact same values (block 214).

Upon receiving delta values $\Delta^{(1)}, \ldots, \Delta^{(k)}$, each server $S_j$ can determine k sets of replicated shares $X_{A(j)}^{(1)}, \ldots, X_{A(j)}^{(k)}$ of client inputs $X^{(1)}, \ldots, X^{(k)}$ by computing $\Delta^{(i)} + R_A^{(i)(j)}$ on every replicated share in $R_{A(j)}$ and on every $i=1, \ldots, k$ (block 216). Finally, at block 218, each server $S_j$ can convert, using a known share conversion algorithm, its sets of replicated shares $X_{A(j)}^{(1)}, \ldots, X_{A(j)}^{(k)}$ into corresponding Shamir shares $X'_j^{(1)}, \ldots, X'_j^{(k)}$ (or any other appropriate secret sharing format) for use in downstream phases of MPC protocol 104 and the flowchart can end.

4. Extensions

As mentioned previously, in some MPC applications there may be multiple clients $C^{(1)}, \ldots, C^{(m)}$ rather than a single client C, each providing k inputs to servers $S_1, \ldots, S_n$. In addition, each client may be configured to submit k inputs periodically over multiple protocol epochs $e^{(1)}, \ldots, e^{(l)}$. eRIP can be extended to handle these and other similar scenarios in an efficient manner (i.e., without increasing the number of random sharings that need to be generated and sent from the servers to the clients).

Figure 3:
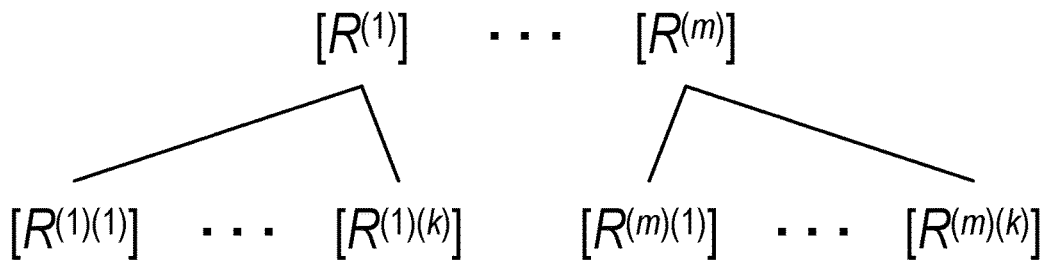
FIGS. 3 and 4 depict hierarchical extensions of the protocol of the present disclosure according to certain embodiments.

For example, in the case of m clients $C^{(1)}, \ldots, C^{(m)}$, servers $S_1, \ldots, S_n$ can generate/establish a replicated sharing of a "master" random secret key R (i.e., [R]) via RSS and derive m pseudorandom replicated sharings $[R^{(1)}], \ldots, [R^{(m)}]$ from [R] via PRSS (one per client). Servers $S_1, \ldots, S_n$ can then provide each client $C^{(i)}$ with its corresponding pseudorandom replicated sharing $[R^{(i)}]$, and the servers and client $C^{(i)}$ can thereafter carry out eRIP (using $[R^{(i)}]$ in the place of [R]) in accordance with flowchart 200. This effectively results in a PRSS hierarchy of two layers, which is shown schematically in FIG. 3: a first layer corresponding to the per-client pseudorandom replicated sharings $[R^{(1)}], \ldots, [R^{(m)}]$ and a second layer corresponding to the per-input pseudorandom replicated sharings $[R^{(i)(1)}], \ldots, [R^{(i)(k)}]$ derived for each client $C^{(i)}$ from $[R^{(i)}]$. Note that with this approach, the servers still provide only a single sharing $[R^{(i)}]$ to each client $C^{(i)}$.

Figure 4:
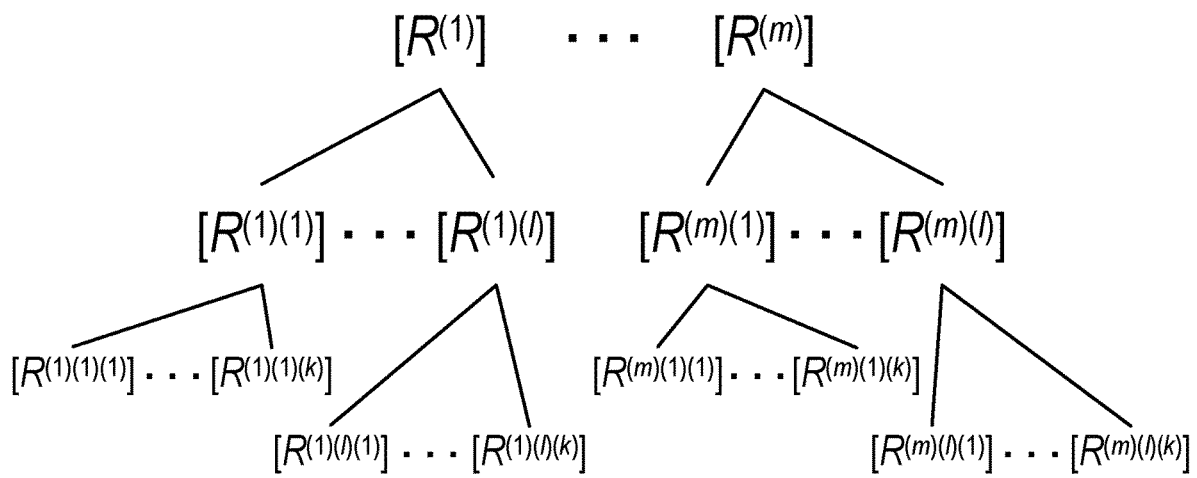

In the further case of m clients $C^{(1)}, \ldots, C^{(m)}$ and l epochs $e^{(1)}, \ldots, e^{(l)}$ per client, servers $S_1, \ldots, S_n$ can generate/establish a replicated sharing of a master random secret key R (i.e., [R]) via RSS, derive m pseudorandom replicated sharings $[R^{(1)}], \ldots, [R^{(m)}]$ from [R] via PRSS, and provide each client $C^{(i)}$ with its corresponding pseudorandom replicated sharing $[R^{(i)}]$ as noted above. The servers and client $C^{(i)}$ can then derive, via PRSS, an epoch-specific pseudorandom replicated sharing $[R^{(i)(j)}]$ for current epoch j from $[R^{(i)}]$, and the servers and client $C^{(i)}$ can thereafter carry out eRIP (using $[R^{(i)(j)}]$ in the place of [R]) in accordance with flowchart 200. This effectively results in a PRSS hierarchy of three layers, which is shown schematically in FIG. 4: a first layer corresponding to the per-client pseudorandom replicated sharings $[R^{(1)}], \ldots, [R^{(m)}]$, a second layer corresponding to the per-epoch pseudorandom replicated sharings $[R^{(i)(1)}], \ldots, [R^{(i)(l)}]$ derived for each client $C^{(i)}$ from $[R^{(i)}]$, and a third layer 404 corresponding to the per-input pseudorandom replicated sharings $[R^{(i)(j)(1)}], \ldots, [R^{(i)(j)(k)}]$ derived for each client $C^{(i)}$ and epoch $e^{(j)}$ from $[R^{(i)(j)}]$. As with the approach above, the servers still provide only a single sharing $[R^{(i)}]$ to each client $C^{(i)}$.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   obtaining, by a server in a plurality of servers, a first set of replicated shares $R_A$ of a random or pseudorandom secret key R;
   transmitting, by the server, the first set of replicated shares $R_A$ to a client that is configured to submit k private inputs $X^{(1)}, \ldots, X^{(k)}$ to the plurality of servers for use in a secure multi-party computation (MPC) protocol;
   determining, by the server, k second sets of replicated shares $R_A^{(1)}, \ldots, R_A^{(k)}$ corresponding to k pseudorandom secret keys $R^{(1)}, \ldots, R^{(k)}$, the determining being performed by applying pseudorandom secret sharing (PRSS) to the first set of replicated shares $R_A$;
   receiving, by the server from the client, a public broadcast of k delta values $\Delta^{(1)}, \ldots, \Delta^{(k)}$ corresponding to the k private inputs $X^{(1)}, \ldots, X^{(k)}$;
   determining, by the server, k third sets of replicated shares $X_A^{(1)}, \ldots, X_A^{(k)}$ corresponding to the k private inputs $X^{(1)}, \ldots, X^{(k)}$ based on the k delta values $\Delta^{(1)}, \ldots, \Delta^{(k)}$ and the k second sets of replicated shares $R_A^{(1)}, \ldots, R_A^{(k)}$; and
   using, by the server, the k third sets of replicated shares $X_A^{(1)}, \ldots, X_A^{(k)}$ as part of a computation phase of the MPC protocol.

2. The method of claim 1 further comprising, prior to using the k third sets of replicated shares $X_A^{(1)}, \ldots, X_A^{(k)}$:
   converting the k third sets of replicated shares $X_A^{(1)}, \ldots, X_A^{(k)}$ into shares that conform to Shamir's secret sharing scheme.

3. The method of claim 1 wherein determining the k second sets of replicated shares $R_A^{(1)}, \ldots, R_A^{(k)}$ comprises:
   computing a pseudorandom function $f(R_A, i)$ for every share in the first set of replicated shares $R_A$ and for $i=1, \ldots, k$.

4. The method of claim 1 wherein determining the k third sets of replicated shares $X_A^{(1)}, \ldots, X_A^{(k)}$ comprises:
   computing $\Delta^{(i)} + R_A^{(i)}$ for $i=1, \ldots, k$.

5. The method of claim 1 wherein the first set of replicated shares $R_A$ are derived via PRSS from a master random secret key that is different from random or pseudorandom secret key R.

6. The method of claim 1 wherein the client determines the k delta values $\Delta^{(1)}, \ldots, \Delta^{(k)}$ by:
   reconstructing the k pseudorandom secret keys $R^{(1)}, \ldots, R^{(k)}$ based on a complete replicated sharing [R] of the random or pseudorandom secret key R received from the plurality of servers; and
   computing $X^{(i)} - R^{(i)}$ for $i=1, \ldots, k$.

7. The method of claim 6 wherein the client reconstructs the k pseudorandom secret keys $R^{(1)}, \ldots, R^{(k)}$ by:
   deriving replicated sharings $[R^{(1)}], \ldots, [R^{(k)}]$ of the k pseudorandom secret keys $R^{(1)}, \ldots, R^{(k)}$ by computing a pseudorandom function $f(R_j, i)$ for every share $R_j$ in the complete replicated sharing [R] and for $i=1, \ldots, k$; and
   reconstructing the k pseudorandom secret keys $R^{(1)}, \ldots, R^{(k)}$ using the replicated sharings $[R^{(1)}], \ldots, [R^{(k)}]$.

8. A non-transitory computer readable storage medium having stored thereon program code executable by a server in a plurality of servers, the program code embodying a method comprising:

obtaining a first set of replicated shares $R_A$ of a random or pseudorandom secret key R;

transmitting the first set of replicated shares $R_A$ to a client that is configured to submit k private inputs $X^{(1)}, \ldots, X^{(k)}$ to the plurality of servers for use in a secure multi-party computation (MPC) protocol;

determining k second sets of replicated shares $R_A^{(1)}, \ldots, R_A^{(k)}$ corresponding to k pseudorandom secret keys $R^{(1)}, \ldots, R^{(k)}$, the determining being performed by applying pseudorandom secret sharing (PRSS) to the first set of replicated shares $R_A$;

receiving, from the client, a public broadcast of k delta values $\Delta^{(1)}, \ldots, \Delta^{(k)}$ corresponding to the k private inputs $X^{(1)}, \ldots, X^{(k)}$;

determining k third sets of replicated shares $X_A^{(1)}, \ldots, X_A^{(k)}$ corresponding to the k private inputs $X^{(1)}, \ldots, X^{(k)}$ based on the k delta values $\Delta^{(1)}, \ldots, \Delta^{(k)}$ and the k second sets of replicated shares $R_A^{(1)}, \ldots, R_A^{(k)}$; and using the k third sets of replicated shares $X_A^{(1)}, \ldots, X_A^{(k)}$ as part of a computation phase of the MPC protocol.

9. The non-transitory computer readable storage medium of claim 8 wherein the method further comprises, prior to using the k third sets of replicated shares $X_A^{(1)}, \ldots, X_A^{(k)}$:

converting the k third sets of replicated shares $X_A^{(1)}, \ldots, X_A^{(k)}$ into shares that conform to Shamir's secret sharing scheme.

10. The non-transitory computer readable storage medium of claim 8 wherein determining the k second sets of replicated shares $R_A^{(1)}, \ldots, R_A^{(k)}$ comprises:

computing a pseudorandom function $f(R_A, i)$ for every share in the first set of replicated shares $R_A$ and for $i=1, \ldots, k$.

11. The non-transitory computer readable storage medium of claim 8 wherein determining the k third sets of replicated shares $X_A^{(1)}, \ldots, X_A^{(k)}$ comprises:

computing $\Delta^{(i)} + R_A^{(i)}$ for $i=1, \ldots, k$.

12. The non-transitory computer readable storage medium of claim 8 wherein the first set of replicated shares $R_A$ are derived via PRSS from a master random secret key that is different from random or pseudorandom secret key R.

13. The non-transitory computer readable storage medium of claim 8 wherein the client determines the k delta values $\Delta^{(1)}, \ldots, \Delta^{(k)}$ by:

reconstructing the k pseudorandom secret keys $R^{(1)}, \ldots, R^{(k)}$ based on a complete replicated sharing [R] of the random or pseudorandom secret key R received from the plurality of servers; and computing $X^{(i)} - R^{(i)}$ for $i=1, \ldots, k$.

14. The non-transitory computer readable storage medium of claim 13 wherein the client reconstructs the k pseudorandom secret keys $R^{(1)}, \ldots, R^{(k)}$ by:

deriving replicated sharings $[R^{(1)}], \ldots, [R^{(k)}]$ of the k pseudorandom secret keys $R^{(1)}, \ldots, R^{(k)}$ by computing a pseudorandom function $f(R_j, i)$ for every share $R_j$ in the complete replicated sharing [R] and for $i=1, \ldots, k$; and reconstructing the k pseudorandom secret keys $R^{(1)}, \ldots, R^{(k)}$ using the replicated sharings $[R^{(1)}], \ldots, [R^{(k)}]$.

15. A server in a plurality of servers, the server comprising:

a processor; and a non-transitory computer readable medium having stored thereon program code that, when executed, causes the processor to:

obtain a first set of replicated shares $R_A$ of a random or pseudorandom secret key R;

transmit the first set of replicated shares $R_A$ to a client that is configured to submit k private inputs $X^{(1)}, \ldots, X^{(k)}$ to the plurality of servers for use in a secure multi-party computation (MPC) protocol;

determine k second sets of replicated shares $R_A^{(1)}, \ldots, R_A^{(k)}$ corresponding to k pseudorandom secret keys $R^{(1)}, \ldots, R^{(k)}$, the determining being performed by applying pseudorandom secret sharing (PRSS) to the first set of replicated shares $R_A$;

receive, from the client, a public broadcast of k delta values $\Delta^{(1)}, \ldots, \Delta^{(k)}$ corresponding to the k private inputs $X^{(1)}, \ldots, X^{(k)}$;

determine k third sets of replicated shares $X_A^{(1)}, \ldots, X_A^{(k)}$ corresponding to the k private inputs $X^{(1)}, \ldots, X^{(k)}$ based on the k delta values $\Delta^{(1)}, \ldots, \Delta^{(k)}$ and the k second sets of replicated shares $R_A^{(1)}, \ldots, R_A^{(k)}$; and use the k third sets of replicated shares $X_A^{(1)}, \ldots, X_A^{(k)}$ as part of a computation phase of the MPC protocol.

16. The server of claim 15 wherein the program code further causes the processor to, prior to using the k third sets of replicated shares $X_A^{(1)}, \ldots, X_A^{(k)}$:

convert the k third sets of replicated shares $X_A^{(1)}, \ldots, X_A^{(k)}$ into shares that conform to Shamir's secret sharing scheme.

17. The server of claim 15 wherein the program code that causes the processor to determine the k second sets of replicated shares $R_A^{(1)}, \ldots, R_A^{(k)}$ comprises program code that causes the processor to:

compute a pseudorandom function $f(R_A, i)$ for every share in the first set of replicated shares $R_A$ and for $i=1, \ldots, k$.

18. The server of claim 15 wherein the program code that causes the processor to determine the k third sets of replicated shares $X_A^{(1)}, \ldots, X_A^{(k)}$ comprises program code that causes the processor to:

compute $\Delta^{(i)} + R_A^{(i)}$ for $i=1, \ldots, k$.

19. The server of claim 15 wherein the first set of replicated shares $R_A$ are derived via PRSS from a master random secret key that is different from random or pseudorandom secret key R.

20. The server of claim 15 wherein the client determines the k delta values $\Delta^{(1)}, \ldots, \Delta^{(k)}$ by:

reconstructing the k pseudorandom secret keys $R^{(1)}, \ldots, R^{(k)}$ based on a complete replicated sharing [R] of the random or pseudorandom secret key R received from the plurality of servers; and computing $X^{(i)} - R^{(i)}$ for $i=1, \ldots, k$.

21. The server of claim 20 wherein the client reconstructs the k pseudorandom secret keys $R^{(1)}, \ldots, R^{(k)}$ by:

deriving replicated sharings $[R^{(1)}], \ldots, [R^{(k)}]$ of the k pseudorandom secret keys $R^{(1)}, \ldots, R^{(k)}$ by computing a pseudorandom function $f(R_j, i)$ for every share $R_j$ in the complete replicated sharing [R] and for $i=1, \ldots, k$; and reconstructing the k pseudorandom secret keys $R^{(1)}, \ldots, R^{(k)}$ using the replicated sharings $[R^{(1)}], \ldots, [R^{(k)}]$.

* * * * *